US011018550B2

(12) United States Patent
Kitamura et al.

(10) Patent No.: US 11,018,550 B2
(45) Date of Patent: May 25, 2021

(54) ROTARY ELECTRIC MACHINE

(71) Applicant: Mitsubishi Electric Corporation, Tokyo (JP)

(72) Inventors: Ryuji Kitamura, Tokyo (JP); Takanori Onoue, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 63 days.

(21) Appl. No.: 16/384,114

(22) Filed: Apr. 15, 2019

(65) Prior Publication Data
US 2020/0144885 A1 May 7, 2020

(30) Foreign Application Priority Data

Nov. 5, 2018 (JP) .............................. JP2018-207914

(51) Int. Cl.
*H02K 5/24* (2006.01)
*H02K 1/14* (2006.01)
*H02K 3/52* (2006.01)
*H02K 1/18* (2006.01)

(52) U.S. Cl.
CPC .............. *H02K 5/24* (2013.01); *H02K 1/146* (2013.01); *H02K 1/185* (2013.01); *H02K 3/522* (2013.01); *H02K 2203/06* (2013.01)

(58) Field of Classification Search
CPC .......... H02K 5/24; H02K 1/146; H02K 3/522; H02K 1/185; H02K 2203/06; H02K 11/20; H02K 5/225
USPC ......................................................... 310/51
See application file for complete search history.

(56) References Cited

U.S. PATENT DOCUMENTS

| 8,288,905 B2 * | 10/2012 | Qin ........................... H02K 5/15 310/89 |
| 9,444,293 B2 * | 9/2016 | Yoshinori ................ H02K 5/04 |
| 9,525,314 B2 * | 12/2016 | Sato ........................ H02K 5/04 |
| 10,381,893 B2 * | 8/2019 | Saki ....................... H02K 1/14 |
| 10,658,888 B2 * | 5/2020 | Tsuiki ..................... H02K 1/18 |
| 2018/0241261 A1 | 8/2018 | Yamashita et al. |

(Continued)

FOREIGN PATENT DOCUMENTS

| JP | 2010-263691 A | 11/2010 |
| JP | 2016-032355 A | 3/2016 |
| JP | 2018137964 A | 8/2018 |

OTHER PUBLICATIONS

Japanese Office Action dated Jul. 7, 2020 in Patent Application No. 2018-207914.

(Continued)

*Primary Examiner* — John K Kim

(74) *Attorney, Agent, or Firm* — Sughrue Mion, PLLC; Richard C. Turner

(57) ABSTRACT

Provided is a rotary electric machine that decreases the rigidity of a frame into which a stator core is press-fitted and is also able to maintain the circularity of the frame. The rotary electric machine includes a rotatably held rotor, a stator having a stator core on which a coil is wound and which is disposed so as to oppose the rotor, and an annular frame holding the stator core. The frame has a tubular drum portion holding the stator core and a plurality of flange portions, and a plurality of grooves are formed on an end portion of the drum portion in an axial direction of the drum portion by cutting the drum portion.

16 Claims, 8 Drawing Sheets

(56) References Cited

U.S. PATENT DOCUMENTS

| | | | |
|---|---|---|---|
| 2019/0252941 A1* | 8/2019 | Onishi | H02K 9/22 |
| 2019/0296601 A1* | 9/2019 | Yamaguchi | H02K 3/522 |
| 2020/0144885 A1* | 5/2020 | Kitamura | H02K 5/24 |

OTHER PUBLICATIONS

Communication dated Dec. 17, 2019 from Japanese Patent Office in counterpart JP Application No. 2018-207914.

* cited by examiner

ROTARY ELECTRIC MACHINE

BACKGROUND OF THE INVENTION

1. Field of the Invention

The present disclosure relates to a rotary electric machine.

2. Description of the Background Art

As a vehicular rotary electric machine, a rotary electric machine has been known which includes: a stator; a rotor disposed at the radially inner side of the stator so as to oppose the stator with a slight interval therebetween; and a housing in which the stator and the rotor are housed. The stator includes an annular stator core on which coils are wound, and a cylindrical holding member fitted onto the outer circumference of the stator core. The stator is fixed to the housing by fastening a flange portion, which is formed at one axial end side of the holding member, to the housing by bolts.

Regarding the stator of such a rotary electric machine, it is conceivable to form a cut-out portion in the flange portion of the holding member in order to inhibit a press-fitting load from being increased when press-fitting the stator core into the holding member. By providing the cut-out portion as described above, a structure is devised in which a press-fitting load applied when press-fitting the stator core into the holding member is reduced, and deformation of the stator core is also inhibited, by using deformation of the holding member. However, since the cut-out portion is formed, the rigidity of the holding member decreases, but there is a problem in that the circularity of the holding member deteriorates.

In response to the problem, Patent Document 1 indicates that uneven stress generated at the cut-out portion is distributed in two directions by providing two cut-out portions in the flange portion such that directions in which the cut-out portions are cut are deviated from each other by 90 degrees, whereby the circularity of the holding member is improved.

Patent Document 1: Japanese Laid-Open Patent Publication No. 2016-032355

However, in the rotary electric machine having the cut-out portions in Patent Document 1, the rigidity of the cylindrical portion of the cylindrical holding member is not changed, and thus inhibition of deformation of the stator core press-fitted in the holding member cannot be considered sufficient. In addition, although the directions of the two cut-out portions are deviated from each other by 90 degrees, since the two cut-out portions are provided in the flange portion, there is a problem in that it is difficult to maintain the circularity of the holding member.

SUMMARY OF THE INVENTION

The present disclosure discloses a technique for solving the above-described problem, and an object of the present disclosure is to provide a rotary electric machine that decreases the rigidity of a holding member and is also able to maintain the circularity of the holding member.

A rotary electric machine disclosed in the present disclosure is a rotary electric machine including: a rotatably held rotor; a stator having a stator core on which a coil is wound and which is disposed so as to oppose the rotor; and an annular frame holding the stator core, wherein the frame has a tubular drum portion holding the stator core and a plurality of flange portions, and a plurality of grooves are formed on an end portion of the drum portion in an axial direction of the drum portion by cutting the drum portion.

In the rotary electric machine disclosed in the present disclosure, since the plurality of grooves are provided on the drum portion of the frame, the rigidity of the drum portion is decreased and it is possible to press-fit and hold the stator core by the frame in a state where the circularity of the frame is maintained.

DETAILED DESCRIPTION OF THE PREFERRED EMBODIMENTS OF THE INVENTION

Figure 1:
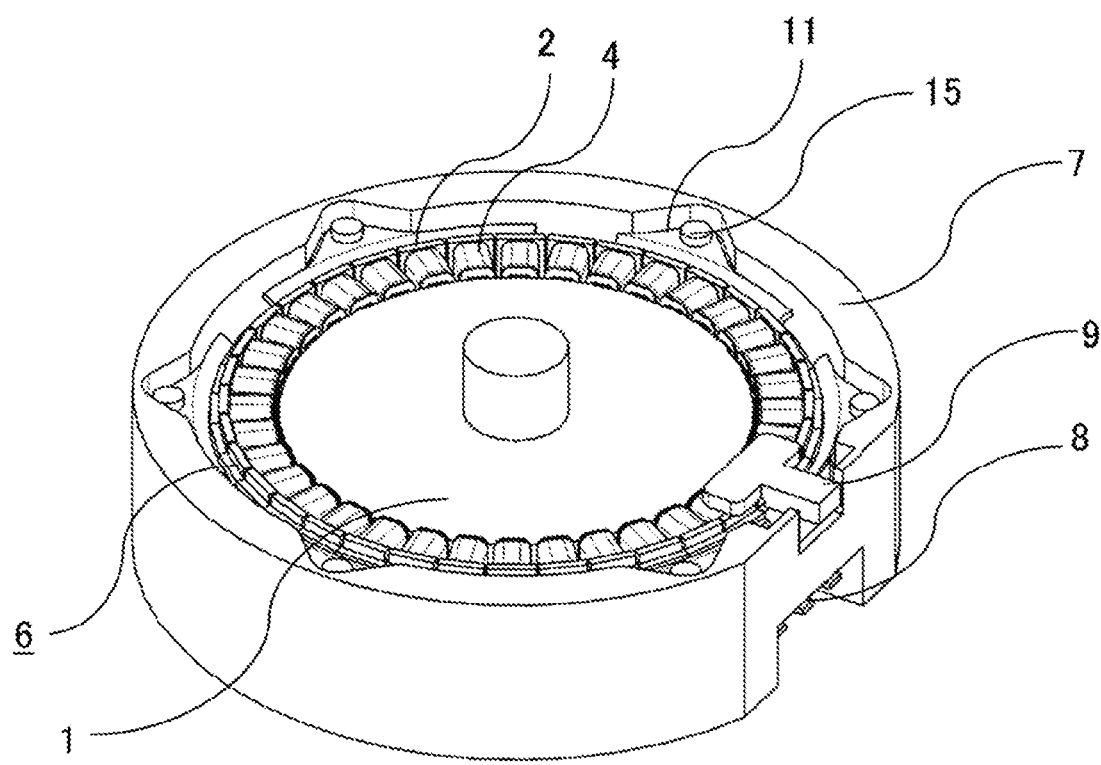
FIG. 1 is a perspective view showing the configuration of a rotary electric machine according to a first embodiment.

Hereinafter, embodiments of the rotary electric machine disclosed in the present disclosure will be described with reference to the drawings. In the respective drawings, the same reference characters denote the same or corresponding parts.

First Embodiment

Figure 2:
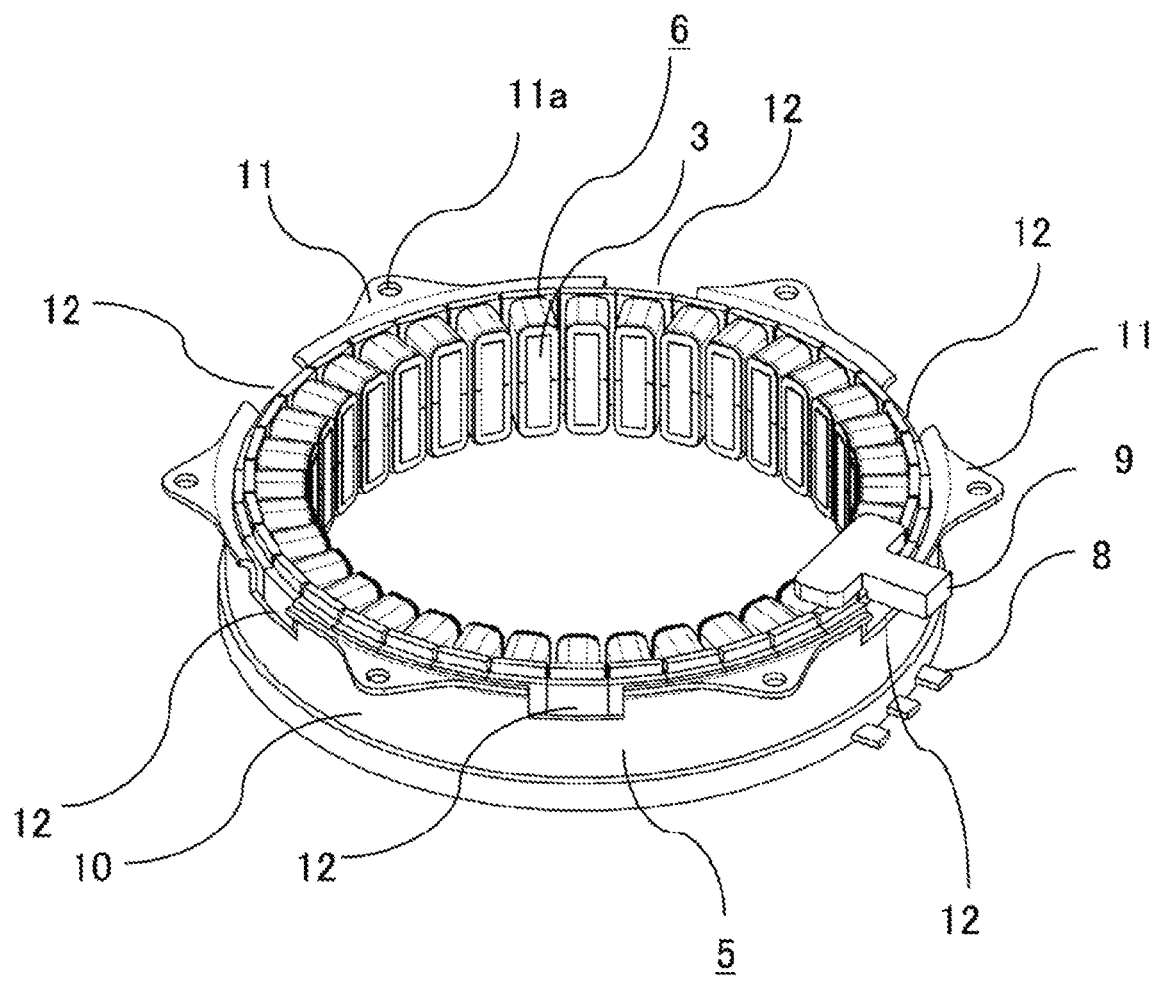
FIG. 2 is a perspective view showing the configuration of a stator of the rotary electric machine according to the first embodiment.

Hereinafter, a rotary electric machine according to a first embodiment will be described with reference to FIGS. 1 to 4. FIG. 1 is a perspective view showing the configuration of the rotary electric machine according to the first embodiment. FIG. 2 is a perspective view showing the configuration of a stator 6, and FIG. 3 is a top view and shows a state where a stator core 2 is press-fitted and held by a frame 5.

As shown in FIG. 1, the stator 6 having a plurality of slots, in which coils 4 are wound so as to oppose each other in the circumferential direction of a rotatably held rotor 1, is housed in a cylindrical case 7. The case 7 and flange portions 11 of the frame 5 shown in FIG. 2 are fixed and assembled to each other by means of welding or by fastening members 15 such as bolts. For example, when the case 7 and the flange portions 11 of the frame 5 are fastened to each other by bolts, stable fixing force can be obtained regardless of the materials of the frame 5 and the case 7.

First, the configuration of the stator 6 will be described. The stator core 2 is assembled by laminating thin electromagnetic steel sheets and caulking or welding the electromagnetic steel sheets such that the electromagnetic steel sheets do not come apart. The stator core 2 is an integrated or divided core and is formed in an annular shape. The stator core 2 has tooth portions 3 that form the plurality of slots, insulating members are attached to the side surfaces of the tooth portions 3, the coils 4 covered with insulating coatings are wound on the tooth portions 3 via the insulating members, and terminal wires to be connected to a wire connection member are led out from the coils 4. A power supply portion 8 is provided to the wire connection member and is connected to an inverter (not shown). Sensors (not shown) such as a temperature sensor and a rotation sensor are mounted to the stator 6, and a wire 9 for taking out signals of the sensors to the outside are led out.

Figure 3:
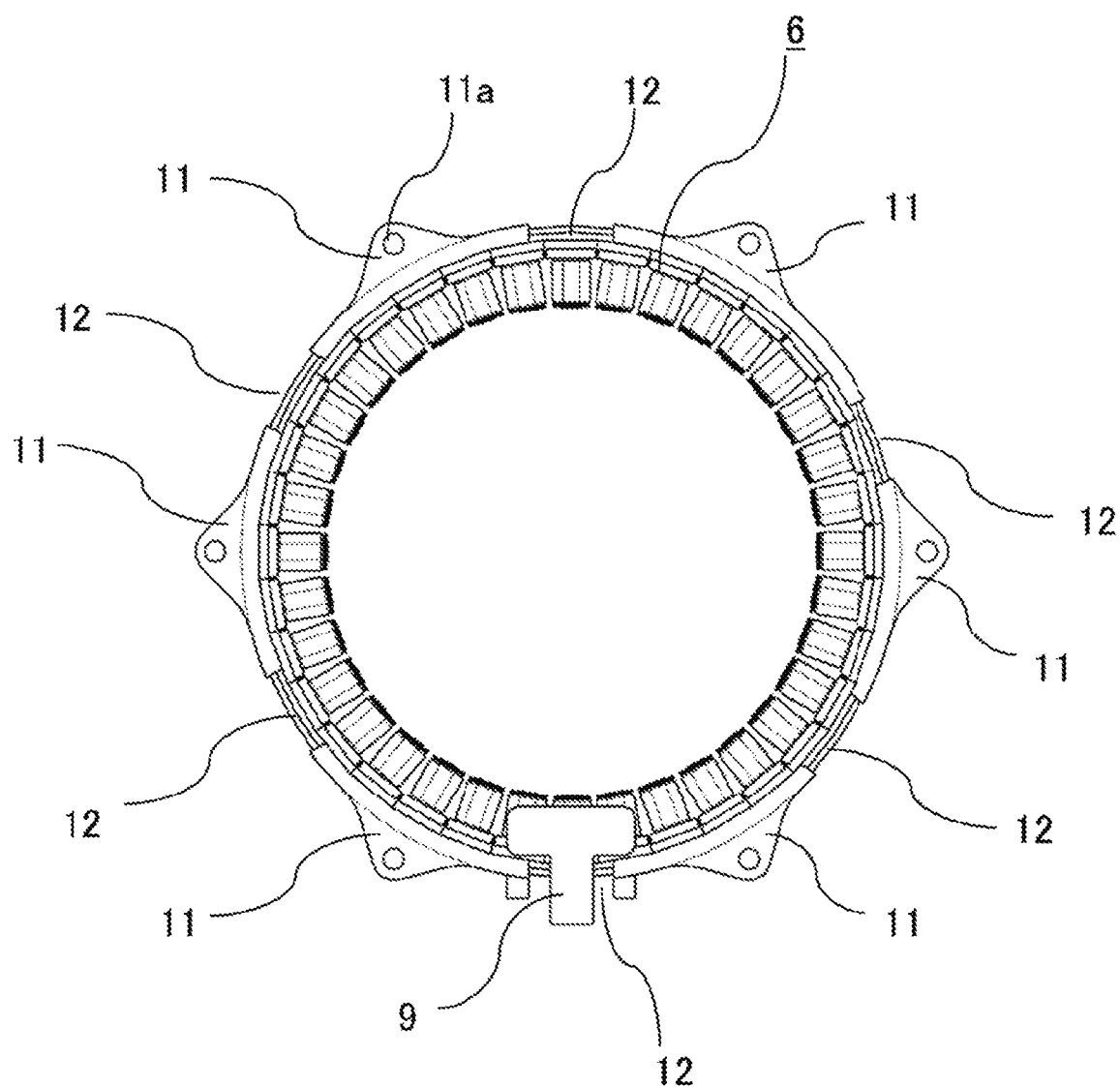
FIG. 3 is a top view showing the stator of the rotary electric machine according to the first embodiment.

As shown in FIGS. 2 and 3, the frame 5 has a cylindrical drum portion 10 and the flange portions 11 formed on a circumferential portion of an end portion of the drum portion 10. Grooves 12 are formed between the adjacent flange portions 11 in the axial direction of the cylinder by cutting the drum portion 10 of the frame 5 by the thickness of the drum portion 10. In the drawings, six grooves 12 are formed on the circumference of the end portion of the drum portion 10 of the frame 5 at equal intervals. In addition, holes 11a into which the fastening members 15 such as bolts for fastening the flange portions 11 and the case 7 together are formed in the flange portions 11. The wire 9 is led through the groove 12 of the frame 5 to the outside.

Figure 4:
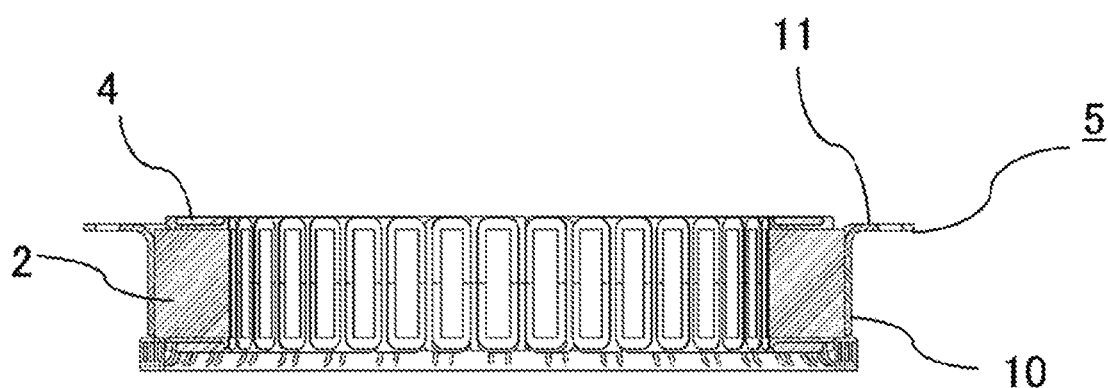
FIG. 4 is a cross-sectional view showing the stator of the rotary electric machine according to the first embodiment.

FIG. 4 corresponds to a cross-sectional view of FIG. 3. The outer circumference of the stator core 2 is held by the frame 5, which has an annular shape, by means of press-fit, shrink-fit, welding, or the like. Owing to the grooves 12 provided on the frame 5, the rigidity of the frame 5 decreases, so that the frame 5 has a structure that allows the drum portion 10 of the frame 5 to easily follow the stator core 2.

The frame 5 is produced, for example, from an iron plate by press working. Specifically, the frame 5 is formed by stamping holes corresponding to the grooves 12 in a flat plate state and then forming the drum portion 10, or forming the drum portion 10 and then stamping or cutting the grooves 12. Due to residual stress remaining when the drum portion 10 is formed, the drum portion 10 becomes deformed with the grooves 12 as base points. For example, when the grooves 12 are formed at one position or at irregular intervals, the rigidity between the grooves 12 becomes ununiform, and an amount of deformation of each portion becomes ununiform, resulting in deterioration of the circularity of the frame 5. Thus, a plurality of grooves 12 are preferably located on the end portion of the frame 5 at substantially equal intervals. In the present embodiment, since the grooves 12 are located on the end portion of the frame 5 at substantially equal intervals, the rigidity between the grooves 12 is made uniform, and the frame 5 has a structure that reduces deformation of the frame 5.

In addition, when the stator core 2 is press-fitted and held by the frame 5, a furnace for shrink-fit or the like is not required, and the assembling can be easy.

In the case where the rotary electric machine according to the present embodiment is used in a vehicle, when the rotary electric machine is, for example, a flat rotary electric machine that is mounted so as to be interposed between the engine and the transmission of the vehicle, spaces at both ends of the case 7 are narrow. Therefore, in the present embodiment, in order to ensure a space for leading out the wire 9 for the signals of the sensors, the grooves 12 are provided on the drum portion 10 of the frame 5, and the wire 9 is led out through the groove 12.

In the above, the flange portion 11 is provided on each portion between the six grooves 12. However, there is no limitation to this configuration, and a plurality of flange portions 11 may be provided on each portion between the grooves 12 and fastened by the fastening members 15. When one or more flange portions 11 are provided on each portion between the grooves 12 and fastened by the fastening members 15, a structure in which vibration is inhibited is formed. The number of grooves 12 is also not limited to six.

In the above, the grooves 12 and the flange portions 11 are provided on the end portion of the drum portion 10 at the same side, but there is no limitation to this configuration. However, when the grooves 12 and the flange portions 11 are provided at the same side, the following advantageous effects are achieved. Specifically, the case 7 is made of, for example, aluminum, and, in the case where the case 7 and the frame 5 made of iron are fastened to each other by the fastening members 15 such as bolts, deformation occurs due to the difference in linear expansion between the materials at high temperature, and the frame 5 is pulled by the case 7. Accordingly, when a connection portion between the drum portion 10 and the flange portion 11 or a bolt-fastened portion is deformed and broken, the force that holds the stator core 2 may decrease. When the grooves 12 are provided near the flange portions 11, that is, the grooves 12 are provided on the end portion of the drum portion 10 of the frame 5 at the side at which the flange portions 11 are provided, the end portion of the drum portion 10 at the side at which the flange portions 11 are provided, and a peripheral portion thereof, become easily deformed. By distributing stress on the flange portions 11 and the fastening members 15, which is generated by deformation due to the difference in linear expansion between the case 7 and the frame 5, to the drum portion 10 side as described above, the stress on the flange portions 11 and the fastening members 15 can be reduced, and thus breakage can be inhibited. In addition, since no grooves 12 are present at the other end side of the drum portion 10 at which no flange portions 11 are present, the drum portion 10 has a structure in which the annular shape thereof is easily maintained at the other end side.

As described above, according to the first embodiment, since the plurality of grooves 12 are provided on the drum portion 10 of the frame 5, the rigidity of the drum portion 10 is decreased, and it is possible to press-fit and hold the stator core 2 by the frame 5 in a state where the circularity of the frame 5 is maintained. When the grooves 12 and the flange portions 11 are provided on the same end portion of the drum portion 10, it is possible to both inhibit thermal deformation and maintain the annular shape of the drum portion 10. In addition, it is possible to lead out the wire 9 through the groove 12. Since the grooves 12 are formed at equal intervals, the rigidity of the frame 5 can be uniform. Furthermore, since one or more flange portions 11 are provided on each portion between the grooves 12 and the frame 5 is fixed at the flange portions 11 to the case 7, the effect of inhibiting vibration is also achieved.

Second Embodiment

Hereinafter, a rotary electric machine according to a second embodiment will be described with reference to FIG. 5.

Figure 5:
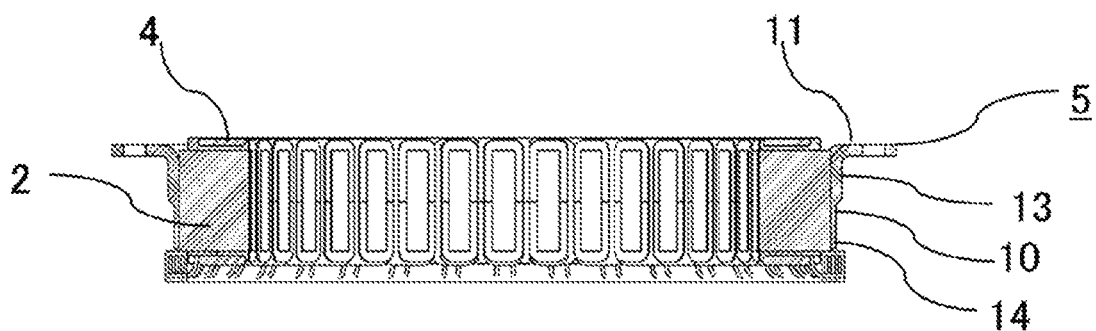
FIG. 5 is a cross-sectional view showing a stator of a rotary electric machine according to a second embodiment.

FIG. 5 is a cross-sectional view of a stator of the rotary electric machine according to the second embodiment. As compared to FIG. 4 for the first embodiment, a portion, at and near the connection portion between the drum portion 10 and each flange portion 11, which is the end portion of the drum portion 10 of the frame 5, is formed with a larger thickness than the other portion of the drum portion 10. Since the portion at and near the connection portion between the drum portion 10 and each flange portion 11 is made thick as described above, an increase in vibration amplitude due to the decrease in rigidity near the flange portions 11 can be inhibited.

When the drum portion 10 is formed with a thick portion 13 and holds the stator core 2, out-of-plane deformation of the stator core 2 easily occurs. Thus, preferably, the thick portion 13 is formed only at and near the connection portion between the drum portion 10 and each flange portion 11, and the stator core 2 is held by a thin portion 14 that is thinner than the thick portion 13. For example, loose fit or transition fit is achieved at the thick portion 13, and interference fit is achieved at the thin portion 14, whereby a structure that inhibits deformation of the stator core 2 is formed. It is not necessary to achieve loose fit or transition fit over the entirety of the thick portion 13, and interference fit may be achieved at a part of the thick portion 13.

As described above, in the second embodiment, the portion at and near the connection portion between the drum portion 10 and each flange portion 11 of the frame 5 is formed as the thick portion 13, and the stator core 2 is held by the thin portion 14 of the drum portion 10 of the frame 5. Thus, in addition to the advantageous effects in the first embodiment, an increase in vibration amplitude can be inhibited, and thus a structure that makes it possible to inhibit deformation of the stator core 2 can be formed.

Third Embodiment

Hereinafter, a rotary electric machine according to a third embodiment will be described with reference to FIGS. 6 and 7.

Figure 6:
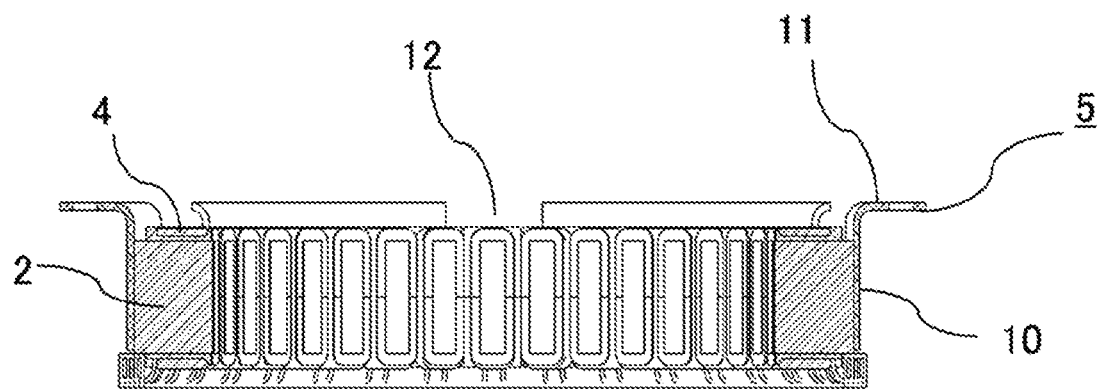
FIG. 6 is a cross-sectional view showing a stator of a rotary electric machine according to a third embodiment.
Figure 7:
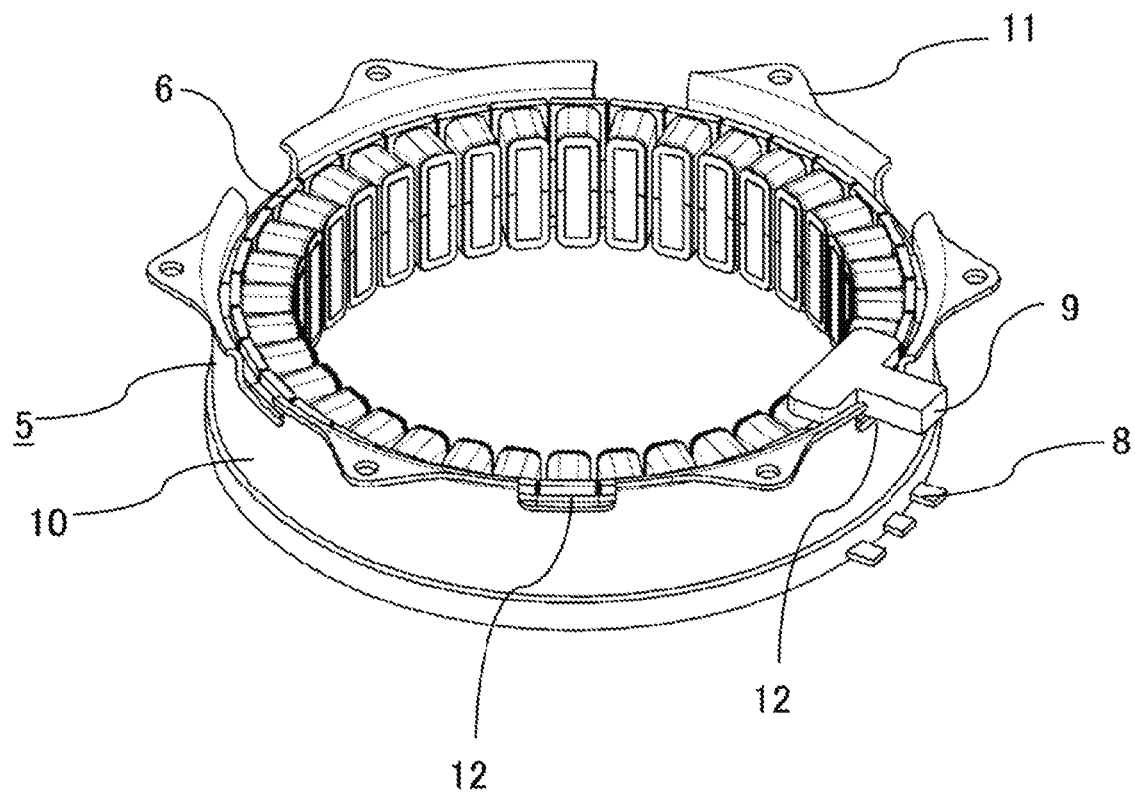
FIG. 7 is a perspective view showing the stator of the rotary electric machine according to the third embodiment.

FIG. 6 is a cross-sectional view of a stator of the rotary electric machine according to the third embodiment, and FIG. 7 is a perspective view of the stator. As compared to FIG. 4 for the first embodiment, the length of the drum portion 10 of the frame 5 is longer than that of the stator core 2. Owing to this structure, the grooves 12 are not formed at the side surface of the stator core 2, so that the area in which the stator core 2 is held is increased and stable holding force can be obtained.

In FIG. 7, the power supply portion 8 to be connected to the inverter is disposed at the side opposite to the side at which the flange portions 11 are provided. However, the power supply portion 8 may be provided at the flange portions 11 side, and, similar to the wire 9 for the signals of the sensors, the power supply portion 8 may be also provided near the groove 12 and a wire may be led out therefrom. That is, the grooves 12 may be used as wiring member leading out ports not only for the wire 9 for the signals of the sensors but also for the power supply portion 8 through which power is supplied to the coils 4 and the wire connection member connected to the power supply portion 8. Here, wiring members include the wire 9, the power supply portion 8, and the wire connection member connected to the power supply portion 8.

In the third embodiment, since the length of the drum portion 10 of the frame 5 is longer than that of the stator core 2 as described above, stable holding force can be obtained. It is also easy to lead out a wire through the groove 12. In addition, the power supply portion 8 and the wire connection member connected to the power supply portion 8 do not need to be led out beyond the flange portion 11, and the overall length of the stator 6 can be reduced.

Fourth Embodiment

Hereinafter, a rotary electric machine according to a fourth embodiment will be described with reference to FIG. 8.

Figure 8:
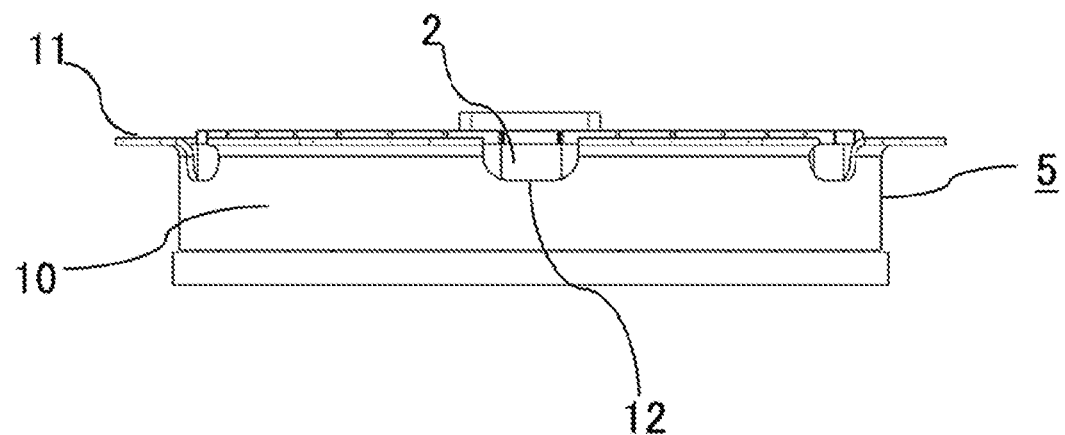
FIG. 8 is a side view showing a stator and a frame of a rotary electric machine according to a fourth embodiment.

FIG. 8 is a side view of a stator and a frame of the rotary electric machine according to the fourth embodiment. Unlike the grooves 12 shown in FIG. 2 for the first embodiment, corner portions connecting the side surfaces and the bottom surface of each groove 12 formed on the drum portion 10 of the frame 5 are formed in a circular arc shape in FIG. 8. That is, each groove 12 has a U shape.

Since each groove 12 is formed in such a shape, when a portion at and near the flange portion 11 of the frame 5 is deformed, stress generated at the corner portions of the groove 12 can be reduced.

Fifth Embodiment

Hereinafter, a rotary electric machine according to a fifth embodiment will be described with reference to FIG. 9.

Figure 9:
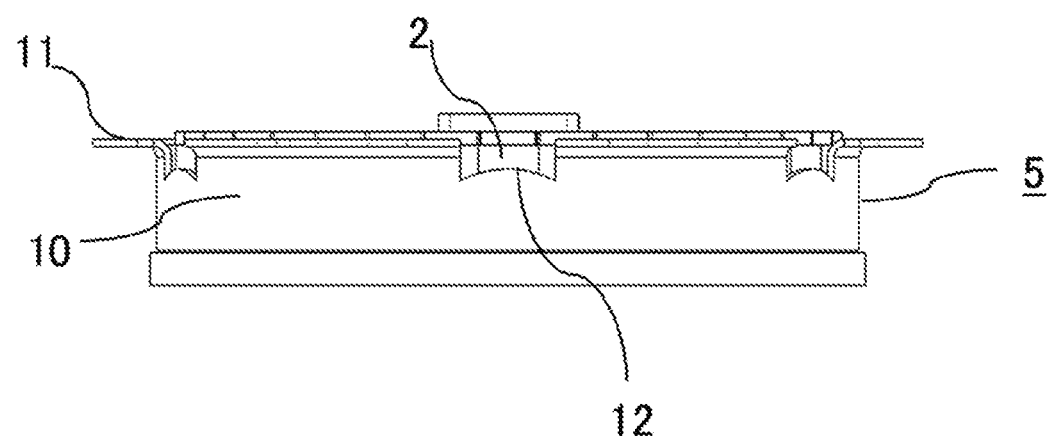
FIG. 9 is a side view showing a stator and a frame of a rotary electric machine according to a fifth embodiment.

FIG. 9 is a side view of a stator and a frame of the rotary electric machine according to the fifth embodiment. Unlike the grooves 12 shown in FIG. 2 for the first embodiment, the bottom surface of each groove 12 formed on the drum portion 10 of the frame 5 has a projecting shape in FIG. 9. This shape does not need to smoothly project as shown in FIG. 9, and may partially project. In addition, this shape may be a projecting shape formed by escape of the material that occurs near the groove 12 when each groove 12 is formed by press working as described above.

Since each groove 12 is formed in such a shape, the opening area of the groove 12 can be decreased, and the area in which the stator core 2 is held can be increased without changing the rigidity near the flange portions 11 of the frame 5.

Sixth Embodiment

Hereinafter, a rotary electric machine according to a sixth embodiment will be described with reference to FIG. 10.

Figure 10:
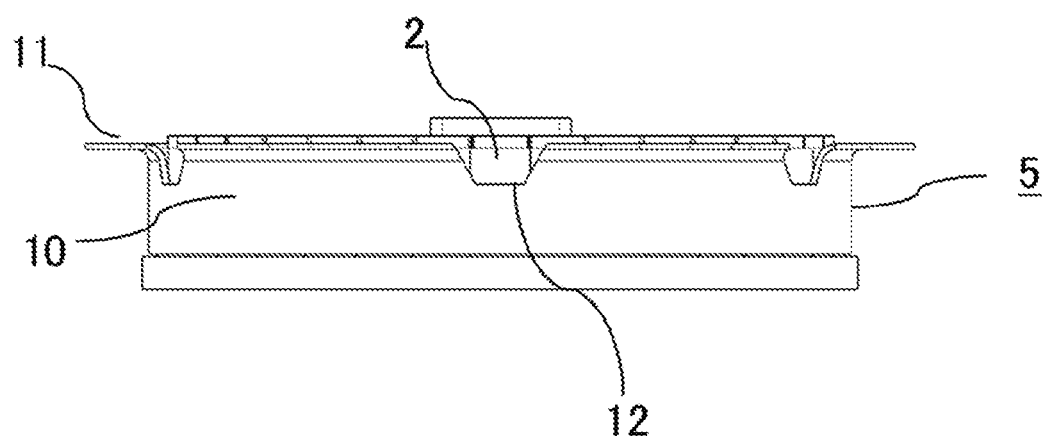
FIG. 10 is a side view showing a stator and a frame of a rotary electric machine according to a sixth embodiment.

FIG. 10 is a side view of a stator and a frame of the rotary electric machine according to the sixth embodiment. Unlike the grooves 12 shown in FIG. 2 for the first embodiment, the side surfaces of each groove 12 formed on the drum portion 10 of the frame 5 are tilted in a tapered shape and connected to the bottom surface of the groove 12 in FIG. 10. In FIG. 10, the side surfaces of each groove 12 are tilted such that the width of the groove 12 decreases from the flange portion 11 to the drum portion 10 in the axial direction. However, the side surfaces of each groove 12 may be tilted such that the width of the groove 12 increases from the flange portion 11 to the drum portion 10. The tilt shape may be formed as a tilt by escape of the material that occurs near the groove 12 when each groove 12 is formed by press working as described above.

When the side surfaces of each groove 12 are tilted such that the width of the groove 12 decreases from the flange portion 11 to the drum portion 10 of the frame 5 as shown in FIG. 10, the area in which the stator core 2 is held can be increased without changing the rigidity near the flange portions 11.

Meanwhile, when the side surfaces of each groove 12 are tilted such that the width of the groove 12 increases from the flange portion 11 to the drum portion 10 of the frame 5, the rigidity near the flange portions 11 can be increased without decreasing the area in which the stator core 2 is held.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 rotor
2 stator core
3 tooth portion
4 coil
5 frame
6 stator
7 case
8 power supply portion
9 wire
10 drum portion
11 flange portion
11a hole
12 groove
13 thick portion
14 thin portion
15 fastening member

What is claimed is:

1. A rotary electric machine comprising:
a rotatably held rotor;
a stator having a stator core on which a coil is wound and which is disposed so as to oppose the rotor; and
an annular frame holding the stator core, wherein
the frame has a tubular drum portion holding the stator core and a plurality of flange portions, and a plurality of grooves are formed on an end portion of the drum portion in an axial direction of the drum portion by cutting the drum portion,
the drum portion of the frame has a thin portion and a thick portion, and each of the plurality of flange portions is formed on the thick portion of the drum portion,
the stator core is held by the thin portion, and
the frame has an interference fit portion at the thin portion and has a loose fit portion at the thick portion, thereby holding the stator core by the thin portion.

2. The rotary electric machine according to claim 1, wherein the flange portions and the grooves are provided on the end portion of the drum portion at the same side.

3. The rotary electric machine according to claim 1, wherein
the grooves are provided at equal intervals over a perimeter of the drum portion.

4. The rotary electric machine according to claim 2, wherein
the grooves are provided at equal intervals over a perimeter of the drum portion.

5. The rotary electric machine according to claim 1, wherein
at least one flange portion is provided in each interval between the grooves.

6. The rotary electric machine according to claim 2, wherein
at least one flange portion is provided in each interval between the grooves.

7. The rotary electric machine according to claim 3, wherein
at least one flange portion is provided in each interval between the grooves.

8. The rotary electric machine according to claim 4, wherein
at least one flange portion is provided in each interval between the grooves.

9. The rotary electric machine according to claim 1, wherein
the drum portion of the frame is longer than the stator core.

10. The rotary electric machine according to claim 1, wherein
a wiring member connected to the stator is led out through the groove of the frame.

11. The rotary electric machine according to claim 10, wherein
the wiring member is at least either one of a wire for a sensor mounted to the stator, a wire connection member through which power is supplied to the coil, and a power supply portion connected to the wire connection member.

12. The rotary electric machine according to claim 1, wherein
the grooves each have a U shape or a shape in which a corner portion connecting each side surface and a bottom surface of the groove has a circular arc shape.

13. The rotary electric machine according to claim 1, wherein
the grooves each have a bottom surface having a projecting shape.

14. The rotary electric machine according to claim 1, wherein
the grooves each have tilted side surfaces.

15. The rotary electric machine according to claim 1, wherein
the frame is housed in a case, and the flange portions are fixed to the case by fastening members.

16. The rotary electric machine according to claim 1, wherein
the stator is press-fitted and held by the frame.

* * * * *